United States Patent Office 3,505,585
Patented Apr. 7, 1970

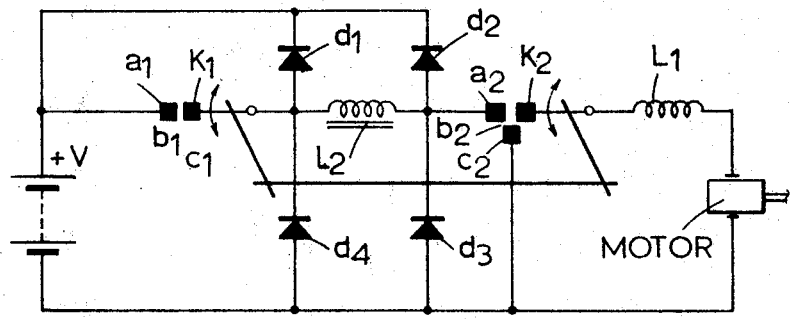
FIG. 5.
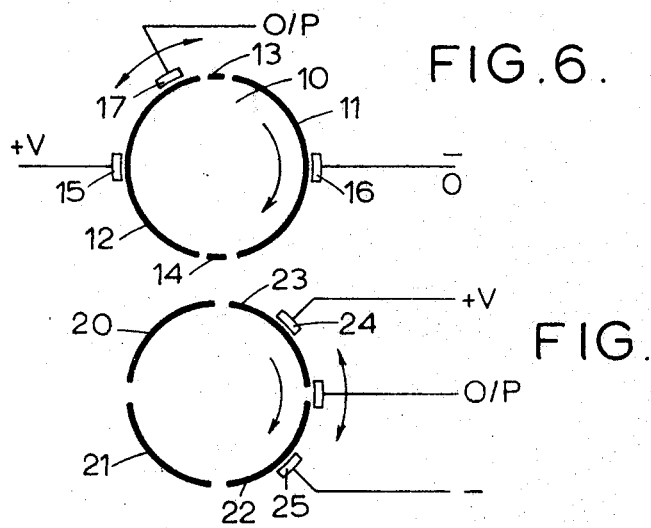
FIG. 6.
FIG. 7.
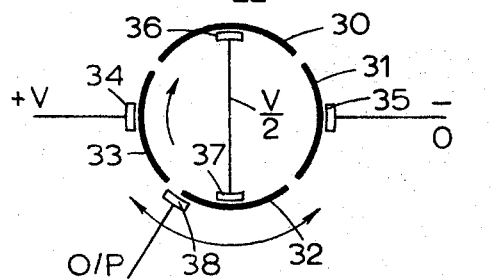
FIG. 8.

3,505,585
ADJUSTABLE D.C. VOLTAGE CONVERTER UTILIZING A MULTI-WAY SWITCH
Wolfgang Bial, 405 Shenley Road, Borehamwood, Hertfordshire, England
Filed Aug. 25, 1967, Ser. No. 663,260
Int. Cl. H02m 3/22
U.S. Cl. 321—2                                  12 Claims

ABSTRACT OF THE DISCLOSURE

An adjustable direct-current converter is disclosed for adjusting the voltage from a low impedance source, such as a battery, for driving a motor or the like. The converter includes a multi-way switching means having a common terminal and at least two other terminals. The common terminal is connected through an inductor to one of a pair of output terminals. The two other terminals are connected to a pair of input terminals. The time intervals during which the common terminal engages the two other terminals is selectively adjustable.

---

Figure 1:
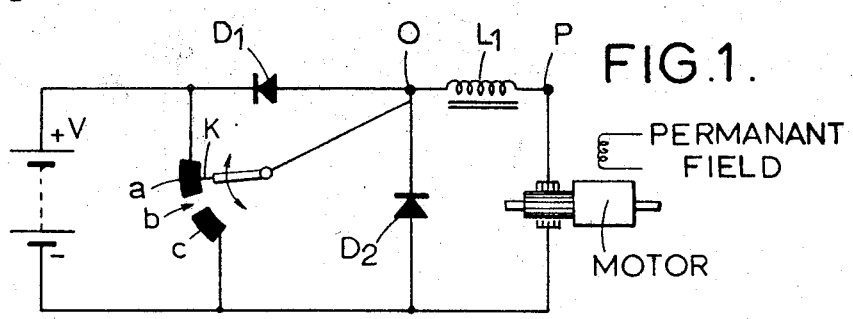

This invention relates to adjustable voltage converters and in particular to apparatus for converting a D.C. voltage input into an output voltage comprising a D.C. voltage, the apparatus including means for adjusting the level of said output D.C. voltage. The converter according to this invention is intended particularly for use with a D.C. input voltage from a low impedance source such as a battery, and one application of the converter would be for providing a D.C. voltage of readily adjustable level for driving a motor. More generally, however converters according to the invention may be used for providing a D.C. voltage of readily adjustable level to any power consuming and/or regenerating device.

According to the present invention there is provided an adjustable voltage converter including a first pair and a second pair of terminals, multi-way switching means, the common terminal of which is connected through an inductor to one of said second pair of terminals and two other terminals of which are connected respectively to the first pair of terminals, one of said two other terminals being connected also to the other one of said second pair of terminals, and means for changing the setting of the switching means from one to the other of said two other terminals at selected adjustable time intervals, whereby in operation a D.C. voltage applied between the two terminals of one of said pairs of terminals causes a voltage to appear across the two terminals of the other of said pairs of terminals, said voltage comprising a D.C. voltage at a level dependent on the relative durations of said time intervals.

Where the D.C. voltage is applied between said first pair of terminals, the voltage appearing across the second pair of terminals may be adjusted within the limits of the D.C. voltage. Where the D.C. voltage is applied between the second pair of terminals, the voltage appearing across the first pair of terminals may be adjusted to a value considerably in excess of the limits of the D.C. voltage.

The inductance provided by the inductor may be partly or even wholly provided by the inherent inductance of the power consuming and/or regenerating device to be supplied by the converter.

Where said multi-way switching means is non-bridging between said two other terminals, one or more non-linear circuit elements, such as semi-conductor diodes, are connected to provide return paths for currents between the output and input terminals during the non-bridging intervals. Such elements are also normally found necessary when said switching means is of the bridging type.

Where the switching means is of the non-bridging type it may be adapted to enable adjustment of the duration of the non-bridging time intervals; it may alternatively or in addition be adapted to enable an open circuit interval on adjustable duration to occur at either or both ends of the said selected switching intervals.

Where said switching means is of the bridging type a further inductor is provided, said further inductor being connected in the circuit between one of said pairs of terminals and said switching means whereby an operation to throttle currents flowing between said pair of terminals through said switching means during the bridging interval, the circuit including return paths for stored energy to flow from the inductor when the switching means is not in the bridging condition.

The switching means may comprise a contact connected to the common terminal and movable between two stationary contacts connected to the other or switch terminals, said means for changing the setting comprising means for moving said contact from one stationary contact to the other selected adjustable time intervals. Alternatively, the inverse arrangement may be employed wherein the contact connected to the common terminal is stationary, and the two contacts connected to the other or switched terminals are movable to alternately engage the stationary contact.

Where the movable contact or contacts are movable in a reciprocatory manner the multi-way switching means may be a two way relay and the means for changing the setting at selected adjustable time intervals comprise means for adjusting the relative durations of the intervals for which the two biasing coils are energised. Alternatively one biasing coil may be used acting against return spring means.

Where the movable contact is movable in a rotary manner the switching means may comprise a brush connected to the common terminal and adapted to be moved in a circular path, as by an electric motor, to alternately engage two contact segments connected to the switched terminals, said contact segments being adjustable whereby to enable said time intervals to be altered.

Said segments may be adjustable in the sense that they may be removed and replaced by others of different relative areas or shapes, or the segment holder may be mounted for movement in the plane of the circular path. An inverse rotary arrangement may of course also be envisaged.

The switching means may alternatively comprise semi-conductor switches connected in a suitable configuration.

Preferably the switching means comprises two or more conducting members mounted for rotation and having at least three brushes disposed to sweep the rotating members, one brush being connected to the common terminal and two other brushes being connected to said two other terminals. In this embodiment the switching means is suitably in the form of a cylinder mounted for rotation about its axis and having two or more mutually insulated curved surface contact areas. The cylinder may be regarded as a commutator wherein desired numbers of bars are connected in series by infilling bars (to reduce brush-wear). The cylinder is suitably rotated by means of an auxiliary electric motor.

Various combinations of the above disclosed forms of the switching means are also contemplated.

The invention is disclosed above as relating to a circuit arrangement including two input terminals and multi-way switching means. In simple applications the arrangement would normally have two input terminals and a two-way switching means. However for certain applications, it may be desirable to employ an arrangement having three or even more input terminals, for supply from selected D.C. voltage inputs, or at zero potential, and to have corresponding three or more way switching means, the arrangement including means for altering the setting of the switching means from one way to another in reversible sequence at selected adjustable time intervals.

Figure 2:
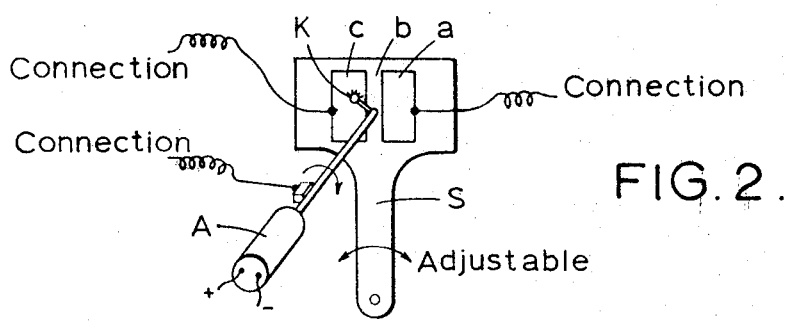
Figure 3:
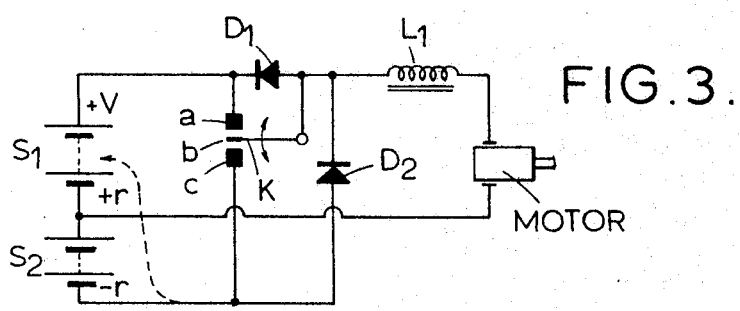
Figure 4:
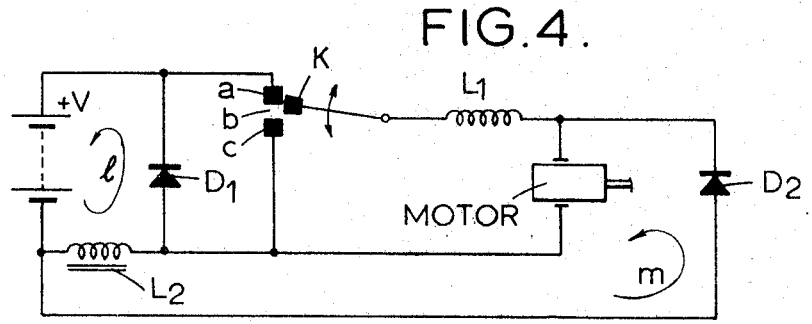
Figure 9:
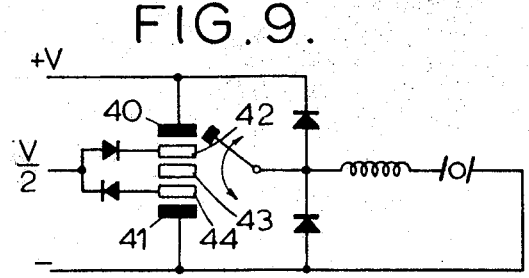
Figure 10:
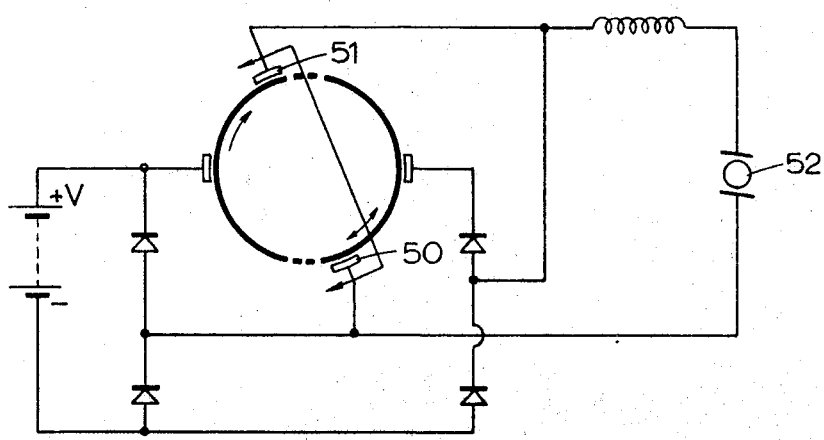
Figure 11:
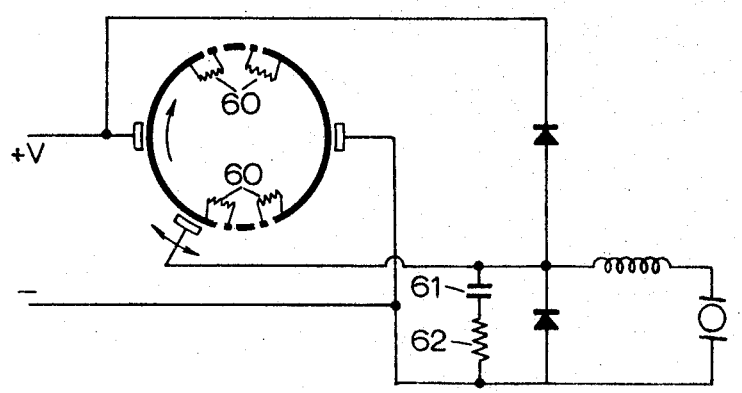

Further features of the invention will appear from the following descriptions of several examples of embodiments thereof taken in conjunction with the accompanying drawings in which:

FIGURE 1 shows an adjustable voltage converter according to the invention connected between a battery source and a motor, FIGURE 2 shows one form of two way switching means, FIGURES 3, 4 and 5 show three further forms of the voltage converter connected between a battery source and the motor, FIGURES 6, 7, 8 and 9 show alternative embodiments of the switching means, and FIGURES 10 and 11 show further alternative embodiments of the voltage converter.

Referring to FIGURE 1 there is shown a battery driving a motor through an adjustable voltage converter. The contact K is moved at selected adjustable time intervals between contact $a$ and contact $c$. The average voltage appearing at O is the average of voltages applied at O in a contact cycle. Where contact K is non-bridging over gap $b$ then, if the time it engages $a$ is $ta$, the time it is in gap $b$ is substantially zero, and the time it engages $c$ is $tc$ then the average voltage at $$O = V/(1 + tc/ta).$$

So if the time interval ratio $tc/ta$ is adjustable from zero to infinity then the voltage appearing across the motor may be adjusted from the voltage of the battery V to zero.

The inductor $L_1$ is inserted to throttle the large currents which could otherwise flow between battery and motor when contact K engages $a$. In the case illustrated, of a motor, the inductance might be wholly or partly derived from the armature inductance. The average D.C. voltage across the inductor when cycling is substantially zero and thus the output voltage of the converter at P is substantially as given by the above expression.

The two diodes provide return paths for currents between the output and input terminals during the non-bridging interval which in practice cannot be reduced to a negligible duration. It will be seen that when contact K is in gap $b$, diode $D_1$ provides a path for any regenerative current and diode $D_2$ for any forward current.

FIGURE 2 shows one form of two-way switching means using similar notation to that used in FIGURE 1. The auxiliary motor A runs at a selected constant speed, suitably driven from the battery and rotates the brush K over the conducting segments $a$ and $c$. It will be clear that if the orientation of the segment holder S is adjusted then the dwell times of contact brush K on $a$ or $c$ are altered. The conducting segments may be shaped with respect to the circular path of the rotating contact brush to obtain a desired dependence of the output voltage on the extent of alteration of orientation of the segment holder. The non-bridging gap $b$ may be widened to soften the control characteristic. The segment holder may also be adjustable in orientation to permit the brush to overtravel segment $a$ thus obtaining additional softening of the characteristic and in particular to permit the motor to overspeed on overhauling torques (i.e. regeneration).

Contact K has been described above as moving between sectors $a$ and $c$ at battery voltage V and zero respectively. In an alternative embodiment, illustrated in FIGURE 3, contact K moves between sectors $a$ and $c$ supplied from different low impedance voltage sources $S_1$ and $S_2$. If $S_2$ is negative, as shown, then the output voltage can be reversed if suitable switching time intervals are selected.

Alternatively, auxiliary switches may be provided for reversing the output voltage using one battery or source.

Where the switching means is of the bridging or make before break type, the diodes $D_1$ and $D_2$ become theoretically unnecessary but are retained as a precaution. However short circuit current can now flow from the battery across contacts $a$ and $c$ during the bridging interval. To throttle this current a further inductor $L_2$ is provided as shown in the arrangement in FIGURE 4. Excess energy stored in the further inductor during the bridging interval flows around either circuit $l$ or $m$, depending on its sense, when contact K attains $a$ or $c$. Such energy is thus usefully dissipated as work against either the battery or the load E.M.F.

A disadvantage under certain conditions of the arrangement of FIGURE 4 is the lack of a common, e.g. ground, reference potential between source and load. The arrangement shown in FIGURE 5 avoids this disadvantage. In this circuit, the switching means comprises switches $K_1$ and $K_2$ operating in synchronism, positions $b_1$ and $c_1$ being open circuit. Energy released from the further inductor $L_2$ may flow in a suitable sense to work against either the battery or the load E.M.F. when $K_1$ and $K_2$ are disconnected from the inductor $L_2$. In the event of energy collision between the two inductors, that from the first inductor has a choice of paths through diode $D_2$ or $D_3$.

Referring to FIGURE 6 there is shown schematically a further embodiment of the two-way switching means. A cylinder 10 is mounted for rotation about its axis by means of an auxiliary electric motor (not shown). The cylinder 10 is provided with two similar mutually insulated curved surface contact areas 11 and 12 optionally spaced and insulated from two bar contacts 13 and 14. The cylinder may be regarded as, or even constructed from, a commutator wherein the areas 11 and 12 are each formed by filling the spaces between adjacent contact strips with metal strips or bars.

The two terminals of the first pair of terminals of the converter are connected to two stationary brushes 15 and 16 set at 180° apart to sweep the rotating contact areas 11 and 12. The common terminal is connected to a third brush 17 which is mounted for adjustable movement over a 180° arc between the brushes 15 and 16. It will be appreciated that movement of the angular position of the third brush permits selective adjustment of the time intervals and that the setting of the switching means is reversed twice during each revolution of the commutator. The provision of isolated bars 13 and 14 permit each contact gap to be only of a single brush width.

FIGURE 7 shows a modification of the commutator of FIGURE 6 wherein four similar contact areas 20, 21, 22 and 23 are provided. In this case the two stationary brushes 24 and 25 are spaced apart by a quadrant of revolution and the third brush is adjustable over the arc defined by said quadrant. It will be seen that the commutator need only be rotated at half the speed of the commutator of FIGURE 6 in order to achieve the same number of switching reversals per unit time.

FIGURE 8 shows a modification of the arrangements of FIGURES 6 and 7 wherein four contact areas 30, 31 and 32 and 33 are provided and the two stationary brushes 34 and 35 are spaced apart by 180°. Two further electrically interconnected stationary brushes 36 and 37 are provided disposed to sweep the commutator contacts at the two points spaced 90° from either of said two stationary brushes. The two further brushes 36 and 37 are connected to a source of potential intermediate in value between the potentials applied to the two stationary brushes 34 and 35. It will be seen that movement of the third brush 38 over the lower left hand quadrant as viewed in FIGURE 8 permits adjustment of the output voltage between V and V/2 and movement of the brush 38 over the lower right hand quadrant permits adjustment of the output between V/2 and O.

FIGURE 9 shows schematically a further embodiment of the switching means, which could also be embodied in a commutator arrangement, but is shown in developed form for convenience. In this arrangement the common terminal (or brush) is cycled between a first contact 40 at potential V and a second contact 41 at zero potential via three intermediate contacts 42, 43 and 44. Contacts 42 and 44 are connected through semi-conductor diodes connected in opposite configuration as shown to a source of potential at V/2, and contact 43 is isolated. The output is thus switched between V and O via the intermediate potential V/2 which will be apparent at either contacts 42 or contacts 44 depending on whether the driven device is consuming or regenerating power. This tends to reduce any sparking tendency where high potentials are employed.

FIGURE 10 shows a commutator arrangement wherein an additional output brush 50 is provided mechanically linked for adjustable movement together with the first output brush 51 and connected to the return current path from the driven motor 52. This arrangement provides a fully reversible system.

In each of the embodiments of FIGURES 6 to 10 wherein a commutator is employed, the commutator may be in the form of mechanically and electrically linked similar pair of commutators mounted for rotation about a common axis. The third or movable brush is disposed to sweep the contact areas of one commutator and the remaining brushes are disposed to sweep the contact areas of the other commutator.

FIGURE 11 illustrates two forms of spark quenching which may be employed separately or together in any of the above commutator arrangements. Firstly, commutating resistor 60 may be connected as shown between each contact area and an adjacent isolated bar, and secondly a series connected compacitor 61 and resistor 62 may be connected as shown.

One advantage of voltage converters as described above is that negligible resistance is introduced between input and output terminals.

I claim:

1. An adjustable direct-current converter including a first pair of terminals, a second pair of terminals and multi-way switching means having a movable common terminal and at least two further terminals, means for moving said common terminal into selective alternate engagement with said further pair of terminals, said common terminal being connected to one of said second pair of terminals, the other of said second pair of terminals being connected to one of said first pair of terminals, said at least two further termnials being connected, respectively, to said first pair of terminals, means for altering the time interval during which the common terminal engages either of said at least two further terminals, at least one non-linear conductive element connected to provide a path for electrical current between said first and second pair of terminals at least during the time interval when the common terminal of said switching means is in non-engagement with either of said at least two further terminals, and an electrically inductive element connected in series with one of said first or second pair of terminals and an output load.

2. A converter according to claim 1 wherein said non-linear element is a semi-conductor diode.

3. A converter according to claim 1 wherein said common terminal of said switching means is non-bridging relative to said at least two further terminals and the non-bridging interval is adjustable in duration.

4. A converter according to claim 1 wherein said common terminal of said switching means is bridging relative to said at least two further terminals and a further inductive element is provided, said further inductive element serving in operation to throttle current flowing between one of said pairs of terminals and the switching means during the bridging interval.

5. A converter according to claim 1, wherein said switching means comprises two or more conductive members mounted for rotation about an axis and four brushes disposed to sweep the conductive members two of said four brushes being stationary and connected, respectively, to said two other terminals of the switching means, the other two of said four brushes being mechanically linked for movement together, one of said other two brushes benig connected to said common terminal and the other of said other two brushes being connected to a return current path from said output load.

6. A converter according to claim 1, wherein said switching means includes at least three said other terminals, the third and any subsequent terminals being adapted for connection to at least one source of potential intermediate in value between the input potential applied in operation between the first or second pair of terminals, the means for altering the time intervals being adapted to change the setting of the switching means from said one other terminal to the third and then to any subsequent terminals and then to said other of said two other terminals in reversible sequence.

7. A converter according to claim 6, wherein the switching means is provided with three said other terminals, the third terminal being adapted for connection to a source of potential substantially half way in value between the input potential applied in operation between the first or second pair of terminals.

8. A converter according to claim 1, wherein said switching means comprises two or more conductive members mounted for rotation about an axis and having at least three brushes, said brushes being disposed to sweep the conductive members, one said brush being connected to said common terminal and two other said brushes being connected to said two other terminals.

9. A converter according to claim 8, wherein said one brush is movable through a limited arc relative to said two other brushes, to enable adjustment of said selected adjustable time intervals.

10. A converter according to claim 8, wherein said switching means comprises a mechanically and electrically linked similar pair of two or more conductive members mounted for rotation about an axis, said one brush being disposed to sweep the members of one of said pair and said two other brushes being disposed to sweep the members of the other of said pair.

11. A converter according to claim 9 wherein said switching means comprises four similar conductive members mounted for rotation about an axis, said two other brushes being spaced apart by a quadrant of electrical revolution and said one brush being movable over the arc defined by said quadrant.

12. A converter according to claim 9 wherein said conductive members are formed as mutually insulated curved surface contact areas of a circular cylinder mounted for rotation about its axis.

References Cited

UNITED STATES PATENTS

| 2,932,780 | 4/1960 | Kaehni | 321—2 |
|---|---|---|---|
| 3,320,511 | 5/1967 | Tiemann | 321—2 |
| 3,358,213 | 12/1967 | Sletback et al. | 321—50 |
| 2,820,941 | 1/1958 | Berkery. | |
| 3,223,915 | 12/1965 | Rverson et al. | |
| 3,320,521 | 5/1967 | Segawa et al. | 323—74 |
| 3,327,202 | 6/1967 | Mills. | |

JAMES D. TRAMMELL, Primary Examiner

G. GOLDBERG, Assistant Examiner

U.S. Cl. X.R.

200—24; 307—96, 132, 151; 323—81, 100